(12) United States Patent
Fenn et al.

(10) Patent No.: US 7,608,676 B2
(45) Date of Patent: Oct. 27, 2009

(54) COATINGS COMPRISING THE REACTION PRODUCT OF A TERPENE, AN ACRYLIC MONOMER AND A PHENOLIC COMPOUND

(75) Inventors: David R. Fenn, Allison Park, PA (US); Simion Coca, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 416 days.

(21) Appl. No.: 11/564,552

(22) Filed: Nov. 29, 2006

(65) Prior Publication Data

US 2008/0121140 A1     May 29, 2008

(51) Int. Cl.
C09D 4/00 (2006.01)
C08G 59/02 (2006.01)
C08G 59/16 (2006.01)

(52) U.S. Cl. .................... 528/87; 528/106; 106/285

(58) Field of Classification Search .............. 528/5, 528/87, 106; 106/285
See application file for complete search history.

(56) References Cited

U.S. PATENT DOCUMENTS

| | | | | |
|---|---|---|---|---|
| 3,478,005 | A | 11/1969 | Wheeler | 260/80.7 |
| 3,761,457 | A | 9/1973 | Arlt, Jr. et al. | 260/88.2 |
| 5,756,624 | A | 5/1998 | Behr et al. | 526/309 |
| 6,773,808 | B2 * | 8/2004 | Ogawa et al. | 428/349 |
| 6,831,125 | B2 | 12/2004 | Sneddon | 524/482 |
| 2004/0234753 | A1 | 11/2004 | Huseman et al. | 428/343 |

FOREIGN PATENT DOCUMENTS

| | | |
|---|---|---|
| DE | 71-2148662 | 9/1971 |
| EP | 0 219 043 | 10/1986 |
| EP | 1 460 119 | 9/2004 |
| GB | 2 406 097 A | 3/2005 |
| JP | 59-027966 | 2/1984 |
| JP | 61-185502 | 8/1986 |
| JP | 2002-020709 | 1/2002 |
| JP | 08003513 | 1/2005 |
| JP | 2005298657 | 10/2005 |
| KR | 2001058969 | 7/2001 |

OTHER PUBLICATIONS

Free radical copolymerization of limonene with butyl methacrylate: synthesis and characterization by Saroj Sharma and A. K. Srivastava; *Indian Journal of Chemical Technology* (2005), 12 (1), 62-67.

Synthesis and characterization of a terpolymer of limonene, styrene, and methyl methacrylate via a free-radical route by Saroj Sharma and A. K. Srivastava; *Journal of Applied Polymer Science* (2004), 91 (4), 2343-2347.

Colloid-chemical properties of polymeric complexes based on polycarboxylic acids and polyacrylamide by Elena Vorobieva, Irina Basalyga, and Mikolay Krutko; *Materials Research Innovations* (2003), 7 (5), 322-325.

Synthesis of poly (β-pinene) -g-poly (meth) acrylate by the combination of living cationic polymerization and atom transfer radical polymerization by Jiang Lu, Hui Liang, Wei Zhang, and Qing Cheng; *Journal of Polymer Science, Part A: Polymer Chemistry* (2003), 41 (9), 1237-1242.

Synthesis of block and graft copolymers of β-pinene by Jiang Lu, Hui Liang, and Baoen Li; *Gaofenzi Xuebao* (2001), (6), 755-759 (English Abstract).

Optically active terpolymer: synthesis and characterization by Prerna Shukla, Akhtar Ali, and A. K. Srivastava; *Journal of the Indian Chemical Society* (2000), 77 (1), 48-49.

Surface-active properties of a copolymer of methacrylic acid with α-pinene by E. V. Vorob'eva and N. P. Krut'ko; *Kolloidnyi Zhurnal* (1993), 55 (3), 16-20 (English Abstract).

Copolymers from α-pinene. Part I. Free radical copolymerization of methyl methacrylate with α-pinene by A. H. K. Yousafzai, Rasheed A. Khan, and Tehzeeb Akhtar; *Pakistan Journal of Scientific and Industrial Research* (1985), 28 (2), 135-8.

Novel turpentine series one-component polyurethane coatings by Lidui Huang, Jian Chen, Maocun Huang, Liangju Yan, Shijiang Chen, and Wenfu Zhou; *Tuliao Gongye* (2001), 31(12), 7-10 (English Abstract).

* cited by examiner

*Primary Examiner*—Tae H Yoon
(74) *Attorney, Agent, or Firm*—Diane R. Meyers

(57) ABSTRACT

Coatings comprising the reaction product of a terpene, an acrylic monomer and a phenolic compound containing at least one unsubstituted carbon atom ortho or para to a phenolic group and/or the reaction product of a phenolic compound containing at least one unsubstituted carbon atom ortho or para to a phenolic group and a compound containing a phenolic reactive group and an epoxy group are disclosed.

20 Claims, No Drawings

COATINGS COMPRISING THE REACTION PRODUCT OF A TERPENE, AN ACRYLIC MONOMER AND A PHENOLIC COMPOUND

FIELD OF THE INVENTION

The present invention relates generally to coatings comprising a terpene, an acrylic monomer and a phenolic compound.

BACKGROUND OF THE INVENTION

Prices of raw materials used in many manufacturing processes continue to rise, particularly those whose price rises or falls with the price of oil. Because of this, and because of the predicted depletion of oil reserves, raw materials derived from renewable resources or alternative resources may be desired. An increase in demand for environmentally friendly products, together with the uncertainty of the variable and volatile petrochemical market, has promoted the development of raw materials from renewable and/or inexpensive sources.

SUMMARY OF THE INVENTION

The present invention is directed to a coating comprising the reaction product of a terpene, an acrylic monomer and a phenolic compound containing at least one unsubstituted carbon atom ortho or para to a phenolic group and/or the reaction product of a phenolic compound containing at least one unsubstituted carbon atom ortho or para to a phenolic group and a compound containing a phenolic reactive group and an epoxy group.

The present invention is further directed to a coating comprising the reaction product of a terpene, an acrylic monomer and a phenolic compound containing at least one unsubstituted carbon atom ortho or para to a phenolic group and/or the reaction product of a phenolic compound containing at least one unsubstituted carbon atom ortho or para to a phenolic group and a compound containing a phenolic reactive group and an epoxy group and a urea; wherein the urea is formed from a reaction mixture comprising an isocyanate-functional component and an amine-functional component, wherein the ratio of equivalents of isocyanate groups to equivalents of amine groups is greater than 1 and the isocyanate-functional component and the amine-functional component can be applied to a substrate at a volume mixing ratio of 1:1.

The present invention is further directed to methods for making such a coating.

DETAILED DESCRIPTION OF THE INVENTION

The present invention is directed to coatings comprising the reaction product of
(i) a terpene,
(ii) an acrylic monomer and
(iii) a phenolic compound containing at least one unsubstituted carbon atom ortho or para to a phenolic group and/or the reaction product of a phenolic compound containing at least one unsubstituted carbon atom ortho or para to a phenolic group and a compound containing a phenolic reactive group and an epoxy group.

In certain embodiments the reaction product specifically excludes methacrylates.

The term "phenolic compound" is sometimes used collectively herein to refer to both a phenolic compound containing at least one unsubstituted carbon atom ortho or para to a phenolic group and a phenolic compound containing at least one unsubstituted carbon atom ortho or para to a phenolic group that has been reacted with one or more compounds comprising a phenolic reactive group and an epoxy group (i.e. a "phenolic compound reaction product"). A phenolic reactive group will be understood as a group that can undergo reaction with a hydroxy moiety.

Terpene, as used herein, includes α-pinene, β-pinene, terpinolene, limonene (dipentene), β-terpinene, γ-terpinene, α-thujene, sabinene, δ-$^3$-carene, camphene, β-cadinene, β-caryophyllene, cedrene, α-bisalbone, β-bisalbone, γ-bisalbone, zingiberene, humulene, (α-caryophyl-1-ene), α-citronellol, linalool, geraniol, nerol, ipsenol, α-terpineol, D-terpineol-(4), dihydrocarveol, nerolidol, farnesol, α-eudesmol, β-eudesmol, citral, D-citronellal, carvone, D-pulegone, piperitone, carvenone, bisabolene, β-selinene, α-santalene, vitamin A, abietic acid and mixtures of these compounds.

Acrylic monomers can include those having the following structure (I)

where Y is $-NR^1{}_2$, $-O-R^2-O-C(=O)-NR^1{}_2$, or $-OR^3$; $R^1$ is H, linear or branched $C_1$ to $C_{20}$ alkyl, or linear or branched $C_1$ to $C_{20}$ alkylol; $R^2$ is methyl, linear, acylic or branched $C_1$ to $C_{20}$ alkyl, alkenyl, aryl, alkaryl or aralkyl, and $R^3$ is H, poly(ethylene oxide), poly(propylene oxide), linear or branched $C_1$ to $C_{20}$ alkyl, alkylol, aryl and aralkyl, linear or branched $C_1$ to $C_{20}$ fluoroalkyl, fluoroaryl and fluoroaralkyl, a siloxane radical, a polysiloxane radical, an alkyl siloxane radical, an ethoxylated trimethylsilyl siloxane radical, or a propoxylated trimethylsilyl siloxane radical. A particularly useful type of acrylic monomers are those described by structure (I) where Y includes at least one functional group of epoxy, oxirane, carboxylic acid, hydroxy, amide, oxazoline, aceto acetate, isocyanate, or carbamate, and $R^2$ is a divalent linear or branched $C_1$ to $C_{20}$ alkyl linking group.

Examples of suitable monomers that fall within structure (I) include, but are not limited to, hydroxyethyl acrylate, hydroxypropyl acrylate, acrylic acid, methyl acrylate, ethyl acrylate, butyl acrylate, isobutyl acrylate, isobornyl acrylate, glycidyl acrylate, dimethylaminoethyl acrylate, acrylamide, perfluoro methyl ethyl acrylate, perfluoro ethyl acrylate, perfluoro butyl ethyl acrylate, trifluoromethyl benzyl acrylate, perfluoro alkyl ethyl acrylate, acryloxyalkyl terminated polydimethylsiloxane, acryloxyalkyl tris(trimethylsiloxy silane), acryloxyalkyl trimethylsiloxy terminated polyethylene oxide, chlorotrifluoro ethylene, glycidyl acrylate, 2-ethylhexyl acrylate, and n-butoxy methyl acrylamide and mixtures thereof.

Examples of phenolic compounds containing at least one unsubstituted carbon atom ortho or para to a phenolic group include but are not limited to phenol, alkyl substituted phenols such as m-cresol or o-cresol, or a compound or resin with two or more phenolic groups, such as a phenolic resin an example of which is a novolac resin. Bisphenol A ("BPA"), or a copolymer of bisphenol A and a compound copolymerizable with bisphenol A are particularly suitable.

Examples of reaction products of phenolic compounds containing at least one unsubstituted carbon atom ortho or para to a phenolic group and compounds comprising a phenolic reactive group and an epoxy group include but are not limited to a glycidyl ether of phenol, a glycidyl ether of an alkyl substituted phenol, such as m-cresol or o-cresol, or a glycidyl ether of a phenolic resin such as a novolac resin Diglycidyl ethers of bisphenol A ("BADGE") (available as EPON 828 from Resolution Specialty Chemicals) or a chain extended diglycidyl ether of bisphenol A are particularly suitable. Methods of chain extending the diglycidyl ether of bisphenol A are described in U.S. Pat. No. 4,260,716, column 3 line 20 to column 4 line 30. In certain embodiments, the phenolic compound is the reaction product of a compound having 2 or more epoxy groups and a compound having 2 or more epoxy-reactive groups. An "epoxy-reactive group" is a group that will react with an epoxy group.

Other suitable monomers that may be polymerized in the reaction product of the present invention include, but are not limited to, acrylonitrile, methacrylonitrile, vinyl halides, crotonic acid, vinyl alkyl sulfonates, and acrolein. Vinyl halides include, but are not limited to, vinyl chloride and vinylidene fluoride. Still others include ethylenically unsaturated monomers such as isobutylene and derivatives thereof, methacrylates and styrenes.

The terpene, acrylic monomer, and phenolic compound can be reacted under any suitable conditions that cause at least some of the terpene and at least some of the acrylic monomer to polymerize. The terpene and acrylic monomer can be polymerized in any manner known in the art, such as by free radical polymerization. Thus, in certain embodiments, a free radical polymerization initiator is used in forming the reaction product. Any standard free radical polymerization method can be used. In certain embodiments, a continuous process for making the polymer at high temperature and high pressure (i.e. greater than 150 psi) using low amounts of initiator (i.e. less than 10 wt %) are used. For example, the temperature can be in a range of 150 to 280° C., such as 160 to 230° C. or 170 to 210° C. In certain embodiments, the polymerization is carried out in the substantial absence of Lewis acids and/or transition metals.

Any suitable free radical polymerization initiator may be used in the present invention. Suitable free radical initiators are typically thermal free radical initiators. Suitable thermal free radical initiators include, but are not limited to, peroxide compounds, azo compounds and persulfate compounds.

Examples of suitable thermal free radical initiator peroxide compounds include, but are not limited to, hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, peroxyketals and mixtures thereof.

Examples of suitable thermal free radical initiator azo compounds include, but are not limited to, 4-4'-azobis(4-cyanovaleric acid), 1-1'-azobiscyclohexanecarbonitrile), 2-2'-azobisisobutyronitrile, 2-2'-azobis(2-methylpropionamidine) dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane)dihydrochloride, 2,2'-azobis(N, N'-dimethyleneisobutyramidine)dihydrochloride, 2-(carbamoylazo)-isobutyronitrile and mixtures thereof.

Also present during the reaction of the terpene and the acrylic is the phenolic compound. The reaction conditions under which the phenolic is added are generally the same as for the polymerization. In certain embodiments, the phenolic compound containing at least one unsubstituted carbon atom ortho or para to a phenolic group may become grafted to or otherwise polymerized with the terpene/acrylic copolymer, although the inventors do not wish to be bound by any mechanism. In certain embodiments, the OH functionality in the reaction product that is derived from the phenolic compound containing at least one unsubstituted carbon atom ortho or para to a phenolic group can be reacted with a compound to add or introduce epoxy groups or functionality, for example epichlorohydrin or the diglycidyl ether of bisphenol A; in other embodiments, the compound can add 2 or more epoxy groups.

Alternatively the terpene, acrylic monomer, and phenolic compound containing at least one unsubstituted carbon atom ortho or para to a phenolic group and a compound containing two or more epoxy groups can be reacted under conditions that cause the acrylic monomer and at least a portion of the terpene to polymerize and simultaneously cause the phenolic compound containing at least one unsubstituted carbon atom ortho or para to a phenolic group to react with the compound having two or more epoxy groups. The ratio of the phenolic compound and the compound having two or more epoxy groups can be adjusted so that the reaction product contains epoxy functionality.

A further alternative is to react the terpene, acrylic monomer and phenolic compound reaction product under conditions that cause the acrylic monomer and at least a portion of the terpene to polymerize.

The reaction product of the present invention, wherein the terpene and acrylic monomer are polymerized in the presence of the phenolic compound, is different from the product that results when a terpene and acrylic monomer are polymerized and then blended with a phenolic compound. The present reaction products are also different from the product obtained when terpene is reacted with or modified by a phenolic, such as phenol or cresol, alone. More specifically, the reaction product of the present invention, when converted to an aqueous dispersion, has greater dispersion stability. Also, in certain embodiments it may be possible to use greater amounts of the terpene/acrylic copolymer in a coating, such as an electrodepositable coating, according to the present invention as compared to when a terpene/acrylic copolymer is blended with an epoxy resin to form a coating.

Typically, the terpene comprises 5 to 60 wt %, such as 10 to 50 wt %, of the total solids weight of the reaction product. In certain embodiments, the terpene comprises 20 wt % or greater, such as 30 wt %, or greater, of the reaction product. The phenolic compound can comprise 5 to 70%, such as 10 to 60 wt %, of the reaction product. The acrylic monomer can comprise 5 to 50 wt %, such as 10 to 40 wt % of the reaction product.

A "coating" according to the present invention will generally be understood as a composition that, when cured, can form a substantially continuous film that forms a surface layer that provides a decorative and/or protective function, and is not tacky or sticky when cured. Thus, in certain embodiments, the coatings according to the present invention would not include adhesives. In certain other embodiments, the coating of the present invention would not include laminates.

It will be appreciated that the reaction product described herein, as used in the present coatings, can form part of the film-forming resin of the coating and in certain embodiments crosslinks with the other film-forming components. It will be appreciated by those skilled in the art that a cured coating in which terpene containing polymers are used as a solvent, chain transfer agent, or tackifier or other additive would have a relatively low amount of terpene in it as distinguished from certain embodiments of the present invention.

In certain embodiments, one or more additional film-forming resins are also used in the coating. For example, the coating compositions can comprise any of a variety of thermoplastic and/or thermosetting compositions known in the art. The coating compositions may be water-based or solvent-based liquid compositions, or, alternatively, in solid particulate form, i.e., a powder coating.

Thermosetting or curable coating compositions typically comprise film forming polymers or resins having functional groups that are reactive with either themselves or a crosslinking agent. The film-forming resin can be selected from, for example, acrylic polymers, polyester polymers, polyurethane polymers, polyamide polymers, polyether polymers, bisphenol A based epoxy polymers, polysiloxane polymers, copolymers thereof, and mixtures thereof. Generally, these polymers can be any polymers of these types made by any method known to those skilled in the art. Such polymers may be solvent borne or water dispersible, emulsifiable, or of limited water solubility. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups and tris-alkyl-carbamoyltriazine) mercaptan groups, anhydride groups, acetoacetate acrylates, uretidione and combinations thereof.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing.

In certain embodiments, the present coatings are electrodepositable and the reaction product can optionally contain anionic or cationic salt groups. In these embodiments, the reaction product can have epoxy functionality, which can be converted to anionic or cationic salt groups. Cationic salt groups can be introduced by the reaction of an epoxy group-containing reaction product of the types described above with appropriate salt forming compounds. For example, sulfonium salt groups can be introduced by reacting a sulfide in the presence of an acid, as described in U.S. Pat. Nos. 3,959,106 and 4,715,898; amine salt groups can be derived from the reaction of an epoxide functional reaction product with a compound containing a primary or secondary amine group, such as methylamine, diethanolamine, ammonia, diisopropanolamine, N-methyl ethanolamine, diethylentriamine, dipropylenetriamine, bishexamethylenetriamine, the diketimine of diethylentriamine, the diketimine of dipropylenetriamine, the diketimine of bishexamethylenetriamine and mixtures thereof. The amine groups can be at least partially neutralized with an acid. Suitable acids include organic and inorganic acids such as formic acid, acetic acid, lactic acid, phosphoric acid, dimethylolpropionic acid and sulfamic acid. Mixtures of acids can be used. The resin can contain primary, secondary and/or tertiary amino groups.

It will be appreciated that in formulating an electrodepositable coating compositions according to the present invention, the reaction product described above can be dispersed in a dispersing medium. The dispersing medium can be water. The dispersion step may be accomplished by combining the neutralized or partially neutralized reaction product with the dispersing medium. Neutralization and dispersion can be accomplished in one step by combining the resin and the dispersing medium. The reaction product can be added to the dispersing medium or the dispersing medium can added to the resin (or its salt). In certain embodiments, the pH of the dispersion is within the range of 4 to 9. The dispersion can be formed at a suitable solids level for the final coating, for example 5 to 15 weight percent, or it can be formed at a higher solids, for example 20 to 45 weight percent, to minimize the weight and volume of material that needs to be stored and transported. The dispersion can then be adjusted to a suitable solids level for coating prior to use. Alternatively the resin, optionally blended with the crosslinker, can be stored and transported as an organic solution and dispersed shortly before use. Suitable conditions for forming such stable dispersions include those set forth in the Examples The cationic salt containing resin according to the present invention can then be used in an ecoat like any other cationic salt known in the art. Thus, the present invention is further directed to a cationic electrodepositable coating wherein the coating comprises the reaction product discussed above. It will be appreciated by those skilled in the art that there may be epoxy functionality in the reaction product that will partially or fully react, such that it may not be present in the cured coating. The ecoat can comprise 10 to 90 wt %, such as 10 to 60 wt % of the reaction product, wherein wt % is based here on the total weight of the coating. In certain embodiments, the ecoat can further comprise one or more other resins commonly used in electrodepositable coatings. Examples include a cationic acrylic resin, such as one derived from an epoxy functional acrylic resin.

The coating compositions may also include a solvent. Suitable solvents include water, organic solvent(s) and/or mixtures thereof. Suitable solvents include glycols, glycol ether alcohols, alcohols, ketones, aromatics, such as xylene and toluene, acetates, mineral spirits, naphthas and/or mixtures thereof. "Acetates" include the glycol ether acetates. In certain embodiments, the solvent is a non-aqueous solvent. "Non-aqueous solvent" and like terms means that less than 50 percent of the solvent is water. For example, less than 10 percent, or even less than 5 percent of the solvent can be water. It will be understood that mixtures of solvents, including or excluding water in an amount of less than 50 percent, can constitute a "non-aqueous solvent".

If desired, the coating compositions can comprise other optional materials well known in the art of formulating coatings, such as plasticizers, anti-oxidants, hindered amine light stabilizers, UV light absorbers and stabilizers, surfactants, flow control agents, thixotropic agents, colorants, fillers, organic cosolvents, reactive diluents, catalysts, and other customary auxiliaries.

As used herein, "colorant" and like terms mean any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as pthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coating of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

The coatings of the present invention can be substantially clear. "Substantially clear" as used herein means that one can see through the coating and that objects viewed through the coating will be visible without significant distortion. It will be appreciated that use of certain colorants will still result in a coating that is substantially clear.

In certain non-limiting embodiments, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting embodiment, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In a non-limiting embodiment, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the coating composition in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

As noted above, the reaction product described herein in conjunction with a crosslinking agent can itself comprise the film-forming resin, or one or more additional film-forming resins can be used, such as hydroxy functional acrylic polymers commonly used in the art, such as MACRYNAL 510 and JONCRYL 500. Such film-forming resins may be described in U.S. Pat. Nos. 5,965,670 and 7,053,149, both of which are hereby incorporated by reference. The reaction product can be self crosslinking. Self crosslinking means that the reaction product contains functional groups that are capable of reacting with themselves, such as alkoxysilane groups, or that the reaction product contains functional groups that are coreactive, for example hydroxyl groups and blocked isocyanate groups. In certain embodiments, when the reaction product contains epoxy groups, blocked isocyanate groups can be introduced by reacting the epoxy groups with the reaction product of a polyamine containing primary and secondary amine groups and an acyclic carbonate as described in WO 2006110515, incorporated by reference herein.

It will be further appreciated that the coatings described herein can be either "one component" ("1K") or "two component" ("2K"), or even multi-component compositions. A 1K composition will be understood as referring to a composition wherein all of the coating components are maintained in the same container after manufacture, during storage, etc. A 1K coating can be applied to a substrate and cured by any conventional means, such as by heating, forced air, and the like. The present coatings can also be 2K coatings or multi-component coatings, which will be understood as coatings in which various components are maintained separately until just prior to application. Typically, one component of the 2K coating comprises a resin and the other component comprises a curing agent therefor. For example, one component can comprise an isocyanate and the other a hydroxyl functional polymer, such as a polyester or acrylic.

As stated above, in certain embodiments, the reaction product described above will react with the other film-forming components, and become part of the film-forming resin of the coating.

The present coatings can be applied to any substrates known in the art, for example automotive substrates and industrial substrates. These substrates can be, for example, metallic, polymeric, transparent plastic substrates, polycarbonate, wood substrates, concrete, glass, and the like.

The coatings of the present invention can be applied by any means standard in the art such as electrocoating, spraying, electrostatic spraying, dipping, rolling, brushing, printing and the like. The coatings can be applied to a dry film thickness of 0.1 to 5 mils, such as 0.5 to 3.0 or 0.9 to 2.0 mils. Even thicker layers, such as 20 to 100 mils, or up to 150 mils, are contemplated in certain embodiments of the present invention. The coatings of the present invention can be used alone, or in combination with other coatings. For example, the coatings can be pigmented or unpigmented, and can be used as a primer, e-coat, base coat, top coat, automotive repair coat and the like. For substrates coated with multiple coatings, one or more of the coatings can be coatings as described herein.

The present invention is further directed to a coating comprising the reaction product of a terpene, an acrylic monomer and a phenolic compound, as described above, and a urea, wherein the urea is formed from a reaction mixture comprising an isocyanate-functional component and an amine-functional component, wherein the ratio of equivalents of isocyanate groups to equivalents of amine groups is greater than 1 and the isocyanate-functional component and the amine-functional component can be applied to a substrate at a volume mixing ratio of 1:1. The terpene can be added straight, or in the form of a polymer, such as those described above.

The present invention is further directed to a method for making a coating comprising adding to the coating a reaction product of a terpene, an acrylic monomer and a phenolic compound, as described above. In certain embodiments the reaction product is prepared as described above. In certain embodiments the reaction product is prepared by subjecting the terpene, acrylic monomer, and phenolic compound and a compound containing two or more epoxy groups to conditions that cause the acrylic monomer and at least a portion of the terpene to polymerize and substantially simultaneously cause the phenolic compound to react with the compound having two or more epoxy groups.

As used herein, unless otherwise expressly specified, all numbers such as those expressing values, ranges, amounts or percentages may be read as if prefaced by the word "about", even if the term does not expressly appear. Also, any numerical range recited herein is intended to include all subranges subsumed therein. Singular encompasses plural and vice versa. For example, although reference is made herein to "a" terpene, "an" acrylic monomer, "a" phenolic compound, "a" compound comprising a phenolic reactive group and an epoxy group, and the like, one or more of each of these and any other components can be used. As used herein, the term "polymer" refers to oligomers and both homopolymers and copolymers, and the prefix "poly" refers to two or more.

EXAMPLES

The following examples are intended to illustrate the invention, and should not be construed as limiting the invention in any way.

Example 1

| | Ingredients | Parts by weight (grams) |
|---|---|---|
| Charge 1 | EPON 828[1] | 245.87 |
| | Bisphenol-A | 106.17 |
| | Methyl isobutyl ketone | 16.58 |
| | Ethyltriphenyl phosphonium iodide | 0.24 |
| | Methyl isobutyl ketone | 18.17 |
| Charge 2 | β-pinene | 60.8 |
| | Methyl acrylate | 39.4 |
| | Hydroxypropyl acrylate | 48.2 |
| Charge 3 | Di-tert.-butyl peroxide | 10.6 |
| | Methyl isobutyl ketone | 10.6 |
| Charge 4 | Di-tert.-butyl peroxide | 3.0 |

[1]Glycidyl ether of Bisphenol A, available from Resolution.

Charge 1 was added to a 1-liter stirred stainless steel pressure reactor. The reactor was then pressured with nitrogen and held at 5 psig. The agitation on the reactor was set at 500 rpms and the reactor temperature was adjusted to 145° C. The temperature was maintained at 145° C. for one hour and was then increased to 170° C. Charges 2 and 3 were then added to the reactor concurrently over 20 minutes. During the monomer addition, the pressure was maintained at 170 PSI. After Charge 2 and 3 were in the reactor, the reaction mixture was held for 20 minutes, charge 4 was added and the temperature and pressure were maintained for a further 90 minutes. The reactor was then cooled to 25° C., and vented. This example represents the use of a phenolic compound reaction product.

Example 2

| | Ingredients | Parts by weight (grams) |
|---|---|---|
| Charge 1 | EPON 828 | 245.87 |
| | Bisphenol-A | 106.17 |
| | Methyl isobutyl ketone | 16.58 |
| | Ethyltriphenyl phosphonium iodide | 0.24 |
| | Methyl isobutyl ketone | 18.17 |
| Charge 2 | turpentine | 60.8 |
| | Methyl acrylate | 39.4 |
| | Hydroxypropyl acrylate | 48.2 |
| Charge 3 | Di-tert.-butyl peroxide | 10.6 |
| | Methyl isobutyl ketone | 10.6 |
| Charge 4 | Di-tert.-butyl peroxide | 3.0 |

Charge 1 was added to a 1-liter stirred stainless steel pressure reactor. The reactor was then pressured with nitrogen and held at 5 psig. The agitation on the reactor was set at 500 rpms and the reactor temperature was adjusted to 170° C. Charges 2 and 3 were then added to the reactor concurrently over 20 minutes. During the monomer addition, the pressure was maintained at 170 PSI. After Charge 2 and 3 were in the reactor, charge 4 was added and the temperature and pressure were maintained for a further 90 minutes. The reactor was then cooled to 25° C., and vented. The reaction product had weight average molecular weight of 3773 (determined by gel permeation chromatography in THF using polystyrene as a standard).

Example 3

|  | Ingredients | Parts by weight (grams) |
|---|---|---|
| Charge 1 | EPON 828 | 245.87 |
|  | Bisphenol-A | 106.17 |
|  | Methyl isobutyl ketone | 16.58 |
|  | Ethyltriphenyl phosphonium iodide | 0.24 |
|  | Methyl isobutyl ketone | 18.17 |
| Charge 2 | turpentine | 121.0 |
|  | Methyl acrylate | 78.8 |
|  | Hydroxypropyl acrylate | 96.4 |
|  | Acrylic acid | 0.70 |
| Charge 3 | Di-tert.-butyl peroxide | 17.5 |
|  | Methyl isobutyl ketone | 10.6 |
| Charge 4 | Di-tert.-butyl peroxide | 3.0 |

Charge 1 was added to a 1-liter stirred stainless steel pressure reactor. The reactor was then pressured with nitrogen and held at 5 psig. The agitation on the reactor was set at 500 rpms and the reactor temperature was adjusted to 185° C. Charges 2 and 3 were then added to the reactor concurrently over 20 minutes. During the monomer addition, the pressure was maintained at 170 PSI. After Charge 2 and 3 were in the reactor, charge 4 was added and the temperature and pressure were maintained for a further 90 minutes. The reactor was then cooled to 25° C., and vented. The reaction product had weight average molecular weight of 4371 (determined by gel permeation chromatography in THF using polystyrene as a standard).

Example 4

This example describes the preparation of a cationic resin according to the present invention, prepared from the following ingredients:

| INGREDIENTS | PARTS BY WEIGHT (g) |
|---|---|
| Reaction product of Example 1 | 516.40 |
| crosslinker prepared as described below | 144.44 |
| Diethanolamine | 3.47 |
| DETA diketimine[2] | 12.38 |
| EPON 828 | 4.47 |

[2]Diketimine formed from diethylene triamine and methylisobutyl ketone (72.69% solids in methylisobutyl ketone).

The reaction product of Example 1 was charged to a reaction vessel and heated under a nitrogen atmosphere to 115° C. The crosslinker was added, the mixture was allowed to exotherm and then the temperature was adjusted to 122° C. After one hour the diethanolamine was added, followed 45 minutes later by DETA diketimine. The mixture was then held at 122° C. for a further 45 minutes. To this was added EPON 828 and the mixture held for 30 minutes more at 125° C. The resin mixture (544.9 parts) was dispersed in aqueous medium by adding it to a mixture of 14.15 parts of sulfamic acid and 323.01 parts of deionized water. The dispersion was further thinned with 196.02 parts of deionized water and 198.60 parts of deionized water in stages and vacuum stripped to remove organic solvent to give a dispersion having a solids content of 33.7 percent. The reaction product had weight average molecular weight of 25365 (determined by gel permeation chromatography in DMF using polystyrene as a standard).

Example 5

This example describes the preparation of a cationic resin according to the present invention, prepared from the following ingredients:

| INGREDIENTS | PARTS BY WEIGHT (g) |
|---|---|
| Reaction product of Example 2 | 506.40 |
| crosslinker prepared as described below | 141.53 |
| Diethanolamine | 3.40 |
| DETA diketimine | 12.13 |
| EPON 828 | 4.38 |

The reaction product of Example 2 was charged to a reaction vessel and heated under a nitrogen atmosphere to 115° C. The crosslinker was added, the mixture was allowed to exotherm and then the temperature was adjusted to 122° C. After one hour the diethanolamine was added, followed 45 minutes later by DETA diketimine. The mixture was then held at 122° C. for a further 45 minutes. To this was added EPON 828 and the mixture held for 30 minutes more at 125° C. The resin mixture (533.95 parts) was dispersed in aqueous medium by adding it to a mixture of 13.87 parts of sulfamic acid and 316.50 parts of deionized water. The dispersion was further thinned with 192.07 parts of deionized water and 194.60 parts of deionized water in stages and vacuum stripped to remove organic solvent to give a dispersion having a solids content of 35.5 percent. The reaction product had weight average molecular weight of 30409 (determined by gel permeation chromatography in DMF using polystyrene as a standard).

Example 6

This example describes the preparation of a cationic resin according to the present invention, prepared from the following ingredients:

| INGREDIENTS | PARTS BY WEIGHT (g) |
|---|---|
| Reaction product of Example 3 | 642.30 |
| Crosslinker prepared as described below | 140.61 |
| Diethanolamine | 3.37 |
| DETA diketimine | 12.05 |
| Epon 828 | 4.35 |

The reaction product of Example 3 was charged to a reaction vessel and heated under a nitrogen atmosphere to 115° C. The crosslinker was added, the mixture was allowed to exotherm and then the temperature was adjusted to 122° C. After one hour the diethanolamine was added, followed 45 minutes later by DETA diketimine. The mixture was then held at 122° C. for a further 45 minutes. To this was added EPON 828 and the mixture held for 30 minutes more at 125° C. The resin mixture (642.15 parts) was dispersed in aqueous medium by adding it to a mixture of 13.78 parts of sulfamic acid and 396.53 parts of deionized water. The dispersion was further thinned with 233.88 parts of deionized water and 236.96 parts of deionized water in stages and vacuum stripped to remove organic solvent to give a dispersion having a solids content of 35.8 percent. The reaction product had weight average molecular weight of 22461 (determined by gel permeation chromatography in DMF using polystyrene as a standard).

Example 7

This example describes the preparation of the amine functional crosslinker that was used in Examples 4, 5, and 6 and was prepared from the following ingredients:

| INGREDIENTS | PARTS BY WEIGHT (g) |
|---|---|
| Bis (hexamethylene) triamine[3] | 3675.69 |
| Propylene carbonate[4] | 2884.32 |
| Methyl isobutyl ketone | 1640.00 |

[3]Available from Invista as DYTEK BHMT-HP.
[4]Available from Sigma-Aldrich Co.

The bis(hexamethylene)triamine was charged to a reaction vessel and heated under a nitrogen atmosphere. The propylene carbonate was added over 3 hrs. The reaction mixture exothermed to 68° C. and was then cooled and maintained at 60° C. The mixture was held at 60° C. for an additional 2 hrs and then methyl isobutyl ketone was added.

Example 8

This example describes the preparation of an electrodeposition bath composition of the present invention. The electrodepostion bath was prepared from a mixture of the following ingredients:

| INGREDIENTS | PARTS BY WEIGHT (g) |
|---|---|
| resin of Example 4 | 1170.0 |
| Plasticizer[5] | 20.7 |
| Solvent[6] | 18.0 |
| propylene glycol monomethyl | 5.7 |
| pigment paste prepared as described below | 140.8 |
| deionized water | 1044.7 |

[5]MAZON-1651 is a plasticizer based on butyl carbitol and formaldehyde, available from BASF.
[6]Ethylene glycol monohexylether, available from Dow.

The paint was made by adding the plasticizer and solvent to the resin under agitation. The blend was then reduced with 300 parts of the deionized water. The pigment paste was reduced with 300 parts of the deionized water, and then blended into the reduced resin mixture under agitation. The remainder of the deionized water was then added under agitation. Final bath solids were about 20%, with a pigment to resin ratio of 0.12:1.0. The paint was allowed to agitate at least two hours. Thirty percent of the total paint weight was removed by ultrafiltration and replaced with deionized water.

A pigment paste suitable for use in the electrodeposition bath compositions of the present invention, and used in Example 8, was prepared from a mixture of the following ingredients:

| INGREDIENTS | PARTS BY WEIGHT (g) |
|---|---|
| cationic grind resin[7] | 525.3 |
| SURFYNOL GA[8] | 1.4 |
| catalyst paste[9] | 175.3 |
| ASP-200[10] | 316.6 |
| CSX-333[11] | 4.3 |
| TRONOX CR800E[12] | 40.3 |
| deionized water | 50.3 |

[7]As described in Example 2 of U.S. Pat. No. 4,715,898, plus 2% by weight on solids of ICOMEEN T-2, available from BASF.
[8]Nonionic surfactant, available from Air Products and Chemicals, Inc.
[9]Dibutyltinoxide catalyst paste, prepared as described below.
[10]Aluminum silicate, available from Engelhard Corporation.
[11]Carbon black beads, available from Cabot Corp.
[12]Titanium dioxide pigment available from Tronox Inc.

The above ingredients were added sequentially under high shear agitation. After the ingredients were thoroughly blended, the pigment paste was transferred to a vertical sand mill and ground to a Hegman value of about 7.25. The pigment paste was then collected.

The catalyst paste used in preparation of the pigment paste was prepared from a mixture of the following ingredients:

| INGREDIENTS | PARTS BY WEIGHT (g) |
|---|---|
| cationic grind resin[13] | 527.7 |
| n-butoxypropanol | 6.9 |
| FASCAT 4201[14] | 312.0 |
| deionized water | 59.8 |

[13]As described in Example 2 of U.S. Pat. No. 4,715,898, plus 2% by weight on solids of ICOMEEN T-2.
[14]Dibutyl tin oxide, available from Arkema, Inc.

Electrocoating Procedure:

The bath composition was electrodeposited onto phosphated cold rolled steel panels, commercially available from ACT Laboratories. The phoshate, which is commercially available from PPG Industries, Inc., was Chemfos 700 with a deionized water rinse. Conditions for cationic electrodeposition were 2 minutes at 92° F. at 150 volts DC to yield a cured dry film thickness of 0.80 mils. The electrocoated substrate was cured in an electric oven at 350° F. for 25 minutes. The electrocoated panels were tested against a standard electrocoat product. The results are recorded the table below. The control product is ED-6280 electrocoat available from PPG Industries Inc.

|  | Test Paint using the resin of Example 4 | ED6280 Control Paint |
|---|---|---|
| Profile** | 6.5/11 | 7/9.5 |
| QCT Humidity Adhesion*** | 10/10 | 10/10 |
| 30 cycles Corrosion Testing**** | 5 mm scribe creep | 4.5 mm scribe creep |

**Profiles were measured using a Taylor Hobson Surtronic 3+ Profilometer with cutoff lengths of 0.03 inch and 0.10 inch, respectively.
***Crosshatch adhesion performed before and after condensing humidity exposure for 16 hours at 140° F. on a QCT condensation tester (Q-Panel Company, Cleveland, OH).
****Each coated panel was scribed, cutting through the coating to the metal substrate in an X pattern. The test panels were then subjected to cyclic corrosion testing by rotating test panels through a salt solution, room temperature dry, and humidity and low temperature in accordance with General Motors test method, GM TM 54-26. Scribe creep is reported as the maximum width (in millimeters) of corrosion across the scribe mark.

Example 9

An electrodeposition bath composition was prepared as described in the Example 8 from the ingredients shown below. Panels were coated and tested as described in Example 8.

| INGREDIENTS | PARTS BY WEIGHT (g) |
|---|---|
| resin of Example 5 | 1004.9 |
| Plasticizer | 19.0 |
| Solvent | 11.0 |
| propylene glycol monomethyl | 4.7 |
| pigment paste | 129.1 |
| deionized water | 1031.2 |

| | Test Paint using the resin of Example 5 | ED6280 Control Paint |
|---|---|---|
| Profile** | 7/8 | 7/9.5 |
| QCT Humidity Adhesion*** | 10/10 | 10/10 |
| 30 cycles Corrosion Testing**** | 5 mm scribe creep | 4 mm scribe creep |

Example 10

An electrodeposition bath composition was prepared as described in the Example 8 from the ingredients shown below. Panels were coated and tested as described in Example 8.

| INGREDIENTS | PARTS BY WEIGHT (g) |
|---|---|
| resin of Example 6 | 1056.6 |
| Plasticizer | 31.1 |
| Solvent | 12.0 |
| propylene glycol monomethyl | 5.2 |
| pigment paste (E6364) | 140.8 |
| deionized water | 1154.3 |

| | Test Paint using the resin of Example 6 | ED6280 Control Paint |
|---|---|---|
| QCT Humidity Adhesion*** | 10/10 | 10/10 |
| 30 cycles Corrosion Testing**** | 6 mm scribe creep | 4 mm scribe creep |

Whereas particular embodiments of this invention have been described above for purposes of illustration, it will be evident to those skilled in the art that numerous variations of the details of the present invention may be made without departing from the invention as described in the appended claims.

We claim:

1. A coating comprising the reaction product of:
   (i) a terpene,
   (ii) an acrylic monomer and
   (iii) a phenolic compound containing at least one unsubstituted carbon atom ortho or para to a phenolic group and/or the reaction product of a phenolic compound containing at least one unsubstituted carbon atom ortho or para to a phenolic group and a compound containing a phenolic reactive group and an epoxy group.

2. The coating of claim 1, wherein component (iii) introduces 2 or more epoxy groups to the reaction product.

3. The coating of claim 1, wherein the terpene comprises β-pinene.

4. The coating of claim 1, wherein the terpene comprises turpentine.

5. The coating of claim 1, wherein the acrylic monomer comprises a hydroxy functional acrylic monomer.

6. The coating of claim 1, wherein component (iii) comprises Bisphenol A.

7. The coating of claim 1, wherein component (iii) comprises bisphenol A diglycidyl ether.

8. The coating of claim 1, wherein the reaction product comprises 10 to 60 wt % of the coating, based on total solids weight.

9. The coating of claim 1, wherein the coating is an electrodepositable coating.

10. The coating of claim 9, wherein the coating is a cationic electrodepositable coating.

11. The coating of claim 1, wherein the coating comprises a colorant.

12. The coating of claim 1, wherein the coating is substantially clear.

13. A coating comprising the reaction product of:
   (i) a terpene,
   (ii) an acrylic monomer and
   (iii) a phenolic compound containing at least one unsubstituted carbon atom ortho or para to a phenolic group and/or the reaction product of a phenolic compound containing at least one unsubstituted carbon atom ortho or para to a phenolic group and a compound containing a phenolic reactive group and an epoxy group and a urea; wherein the urea is formed from a reaction mixture comprising an isocyanate-functional component and an amine-functional component, wherein the ratio of equivalents of isocyanate groups to equivalents of amine groups is greater than 1 and the isocyanate-functional component and the amine-functional component can be applied to a substrate at a volume mixing ratio of 1:1.

14. A method for preparing the coating of claim 1, wherein the reaction product is formed by first reacting the terpene and the acrylic monomer and then reacting component (iii).

15. The coating of claim 2, wherein at least some of the epoxy groups are reacted with salt-forming compounds.

16. The coating of claim 15, wherein the salt-forming compounds are cationic salt-forming compounds.

17. A coating comprising the reaction product of:
   (i) a terpene;
   (ii) an acrylic monomer; and
   (iii) a phenolic compound containing at least one unsubstituted carbon atom ortho or para to a phenolic group and/or the reaction product of a phenolic compound containing at least one unsubstituted carbon atom ortho or para to a phenolic group and a compound containing a phenolic reactive group and an epoxy group, wherein component (iii) introduces 2 or more epoxy groups to the reaction product.

18. The coating of claim 17, wherein the coating is an electrodepositable coating.

19. A coating comprising the reaction product of:
   (i) a terpene,
   (ii) an acrylic monomer comprising a hydroxy functional acrylic monomer; and
   (iii) a phenolic compound containing at least one unsubstituted carbon atom ortho or para to a phenolic group and/or the reaction product of a phenolic compound containing at least one unsubstituted carbon atom ortho or para to a phenolic group and a compound containing a phenolic reactive group and an epoxy group.

20. The coating of claim 19, wherein the coating is an electrodepositable coating.

* * * * *